United States Patent [19]

Polson

[11] Patent Number: 4,639,979
[45] Date of Patent: Feb. 3, 1987

[54] BARBELL COLLAR

[75] Inventor: Gary R. Polson, Stillwater, Okla.

[73] Assignee: Strength, Tech, Inc., Stillwater, Okla.

[21] Appl. No.: 798,354

[22] Filed: Nov. 15, 1985

Related U.S. Application Data

[62] Division of Ser. No. 615,375, May 30, 1984, abandoned.

[51] Int. Cl.[4] .......................................... F16L 23/00
[52] U.S. Cl. ..................................... 24/270; 24/273; 24/530; 272/123; 285/373; 285/409
[58] Field of Search ............... 24/270, 273, 274 P, 24/24, 530; 285/409, 373; 248/230; 273/171; 272/122, 123

[56] References Cited

U.S. PATENT DOCUMENTS

| 204,770 | 6/1878 | Smith | 285/373 |
|---|---|---|---|
| 234,799 | 11/1880 | Neely | 285/373 |
| 1,456,761 | 5/1923 | Bylund | 285/409 |
| 1,646,463 | 10/1927 | Stokesberry | 285/409 |
| 1,976,797 | 10/1934 | Naylor | 285/373 |
| 2,752,174 | 6/1956 | Frost | 285/409 |
| 3,113,791 | 12/1963 | Frost et al. | 285/373 |
| 3,201,156 | 8/1965 | Coats | 24/273 |
| 3,268,245 | 8/1966 | Wood | 285/373 |
| 3,305,234 | 2/1967 | Cline et al. | 24/270 |
| 3,828,403 | 8/1974 | Perrin et al. | 24/270 |
| 4,272,871 | 6/1981 | Weinhold | 24/273 |
| 4,438,958 | 3/1984 | DeCenzo | 285/373 |
| 4,455,020 | 6/1984 | Schnell | 272/123 |
| 4,492,005 | 1/1985 | Begley et al. | 285/409 |

FOREIGN PATENT DOCUMENTS

167983  8/1959  Sweden .................... 24/270

OTHER PUBLICATIONS

Power Lifting-USA, vol. 7, No. 4, pp. 6, 13, 38 and 70, Oct. 1983.
Photograph of the York barbell collar illustrated in Power Lifting-USA, pp. 6 and 70, Oct. 1983.
Exhibit A—Copy of Victaulic Co. of America, catalog G-100E 1/83, 64 pp.
Exhibit B—Victaulic catalog G-100E 1/83, Style 78 Snap-Joint Quick Disconnect Coupling, p. 11.
Exhibit C—Photograph of rubber gasket in Style 78 Snap-Joint Quick Disconnect Coupling.

*Primary Examiner*—Victor N. Sakran
*Attorney, Agent, or Firm*—Dunlap, Codding & Peterson

[57] ABSTRACT

A collar that fits on the bar of a barbell to prevent weights from sliding off the bar. Two semi-circular sections of the collar are hinged together at one end of the sections to permit closure of the sections about the bar and a toggle linkage is mounted on the other ends of the section to hold the collar closed about the bar. Neoprene pads are affixed to the inner peripheries of the sections to grip the bar and prevent movement of weights thereon when the collar is mounted on the bar. The collar can be mounted on the bar or removed therefrom without moving the collar over the end of the bar so that weights can be placed on the bar while the collar is in place and subsequently secured by moving the collar and a weight can be removed from the bar by moving the collar to a position in which the weight is between the collar and the end of the bar prior to moving the weight off the end of the bar.

5 Claims, 7 Drawing Figures

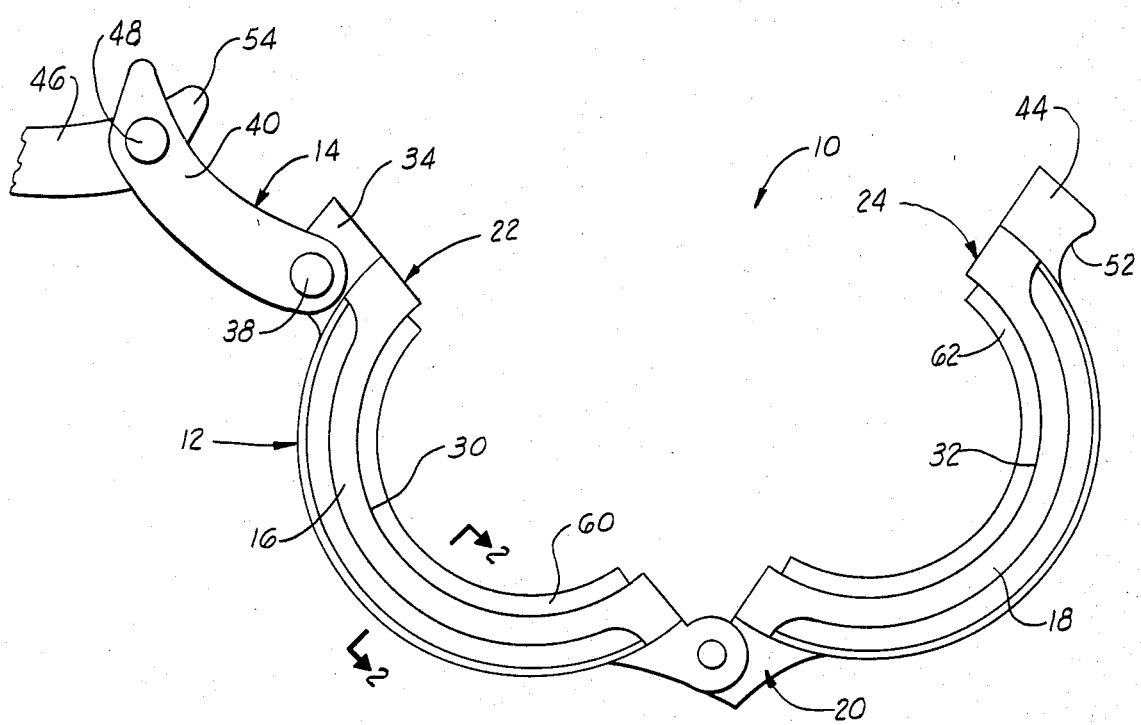
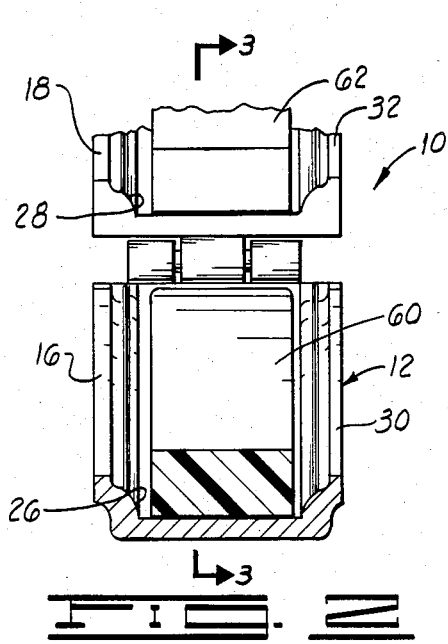
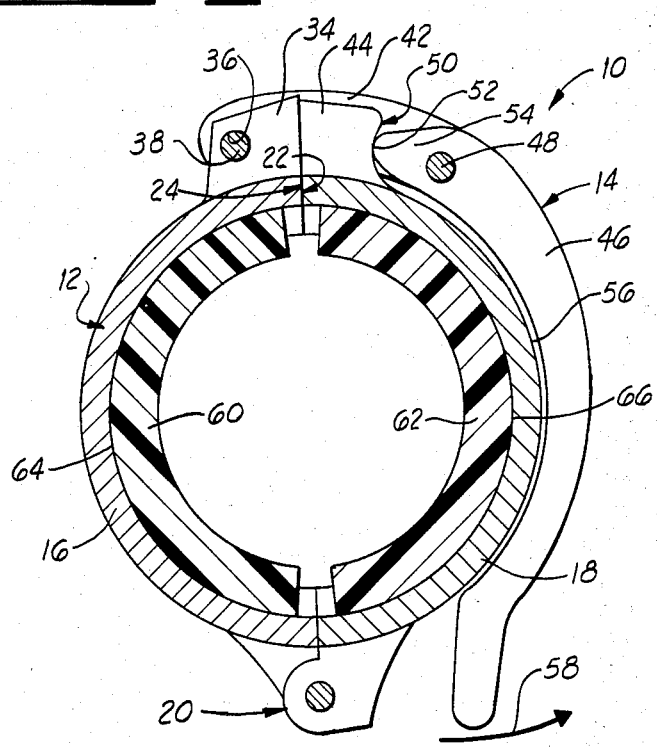

BARBELL COLLAR

This application is a division of Ser. No. 615,375, filed May 30, 1984, now abandoned.

BACKGROUND OF THE INVENTION

1. Field of the Invention

The present invention relates generally to exercise equipment and more particularly, but not by way of limitation, to collars used to hold weights on the ends of bars of barbells.

2. Brief Discussion of the Prior Art

Barbells used in the sport of weight lifting are provided with a number of weights that can be mounted in various combinations on the ends of a bar so that the user can select the weight he will lift in any particular exercise. For this purpose, the weights are discs having holes through their centers so that the bar can be inserted through the holes of the weights the user has selected and collars can be placed on the bars between the weights and the end of the bar to secure the weights on the bar. A variety of types of barbell collars are available to the weight lifter for this purpose.

A consideration which is very important in weight lifting is safety. Should a collar fail during an exercise so that a weight slips off the bar, the weight lifter might be injured by the sudden imbalance of the load he is lifting or by the falling weight. Falling weights can, of course, also be a hazard to bystanders. While this problem can be overcome by appropriate construction of the collar, the solution to the problem provided by prior art collars has often left much to be desired. In general, the greater the security that is designed into a collar, the less convenient the collar is to use. That is, the features of the prior art collars that make the collars secure also make the collar difficult to remove for changing the weights on the end of the bar.

This relationship between collar security and convenience in prior art barbell collars can give rise to the hazards the collars are designed to avoid. For example, in situations in which a number of weight lifters are using the same set of weights in a gymnasium, the weight lifters passing the weights back and forth among themselves as they complete exercises, one or more of the weight lifters may elect to dispense with inconvenient collars rather than break the momentum of his exercises. This practice has been known to occur even though it is equally well known that the practice is very dangerous. Similarly, a balky barbell collar can have a deleterious effect on a weight lifter's performance. Intense mental concentration is a part of weight lifting and a balky barbell collar can break the weight lifter's concentration at a critical time during competition with a subsequent decrease in the weight lifter's performance. An important consideration, then, in the selection of a barbell collar is that the collar be easily mounted on a bar and, at the same time, securely hold weights on the bar.

Safety can also be a problem when weights are added or removed from a barbell. Prior art collars are placed on the bar by sliding them on and off the end of the bar, in the same manner that weights slide on and off the end of the bar, so that a change in the weights on a bar where prior art collars are used is carried out while the collar is removed from the bar. When, as is often the case, central portions of the bar are supported on a rack while weights are added or removed from the ends of the bar, the bar can become sufficiently unbalanced during the weight change to topple the rack or tilt the bar and spill weights off the end of the bar in the absence of a collar on the bar to hold the weights thereon. Additionally, prior art collars are often bulky and heavy so that they are difficult to handle. Injury can occur through dropping of the collars during a weight change.

SUMMARY OF THE INVENTION

The present invention solves these problems by providing a lightweight, easily manipulated barbell collar that securely grips the bar of a barbell while being easily removed for changing weights on the barbell. Moreover, the collar of the present invention can be engaged or disengaged without the necessity of moving the collar on and off the end of the bar so that no weights need be left unconstrained while weights are being added to the bar or removed therefrom. rather, weights can be added to a bar while the collar is in place and the collar can be subsequently repositioned to secure the added weight. Similarly, when a weight is removed from a bar, the collar can be initially moved to a position in which the weight is between the collar and the end of the bar, with the collar engaged to hold remaining weights on the bar, before the weight to be removed is moved off the end of the bar. Thus, should the bar, or the bar and rack, become unstable, no danger exists that weights will spill from the bar as the rack topples or the bar tilts to present the weight lifter and bystanders with a problem of avoiding a large number of falling, heavy objects.

To this end, the barbell collar of the present invention is comprised of a pad support ring that is made in two sections that are hinged together so that the ring can be engaged with the bar while the two sections are pivoted away from each other and then closed about the bar to secure weights thereon. A quick release linkage is provided to interconnect the two sections so that, once the ring is closed about the bar, it can be held in the closed condition by swinging a locking handle of the linkage toward the ring. Alternatively, the locking handle can be moved in an arc away from the ring to permit the two sections of the ring to swing open for removal of the collar from the bar. Elastomeric pads are affixed to the inside of the ring so that, at such times that the ring is closed about the bar, the pads are compressed between the bar and the ring to provide a secure grip on the bar by the collar. Because of the construction of the pad support ring in two sections, no need exists to slide the collar axially along the bar, to or from the end of the bar, to remove the collar from the bar or mount the collar on the bar.

An object of the present invention is to promote safety in weight lifting by providing a barbell collar that is easy and convenient to use.

Another object of the present invention is to provide a barbell collar that will securely grip the bar of a barbell without sacrificing convenience of use.

Another object of the present invention is to provide a barbell collar which will eliminate the need for leaving weights on the barbell unconstrained while weights are added to or removed from the barbell.

A further object of the invention is to provide a light weight barbell collar that is easy to handle during weight changes.

Other objects, advantages and features of the present invention will become clear from the following detailed description of the preferred embodiment of the invention when read in conjunction with the drawings and the appended claims.

BRIEF DESCRIPTION OF THE DRAWINGS

FIG. 1 is a side elevational view in partial cutaway of a barbell collar constructed in accordance with the present invention showing the collar in an open condition.

FIG. 2 is a cross-section in partial cutaway of the collar shown in FIG. 1 taken along line 2—2 of FIG. 1.

FIG. 3 is a cross-section in side elevation of the barbell collar taken along the line 3—3 of FIG. 2 and showing the collar in the closed condition thereof.

DESCRIPTION OF THE PREFERRED EMBODIMENT

Figure 4:
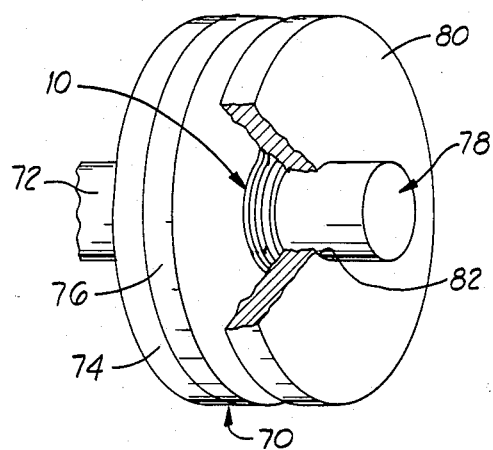
FIGS. 4-7 are elevational views of a portion of a barbell and the barbell collar of the present invention showing the preferred use of the collar to add or remove a weight to or from a barbell.

Referring to the drawings in general and to FIGS. 1-3 in general, shown therein and designated by the general reference numeral 10 is a preferred embodiment of a barbell collar constructed in accordance with the present invention. As shown in these Figures, the barbell collar 10 is comprised of a pad support ring 12 which can be positioned in an open condition shown in FIG. 1 and in a closed condition which has been shown in FIG. 3. At such times that the barbell collar 10 is in use to secure weights to a barbell, the pad support ring 12 is held in the closed condition and a locking assembly, generally designated by the numeral 14 in the Figures, is mounted on the pad support ring 12 for this purpose.

An important advantage of the particular construction of the barbell collar 10 shown is that, with such construction, manufacturing costs of the collar 10 are minimized. In particular, the pad support ring 12 and locking assembly 14 can be purchased as a unit from suppliers of pipe couplings, for which such units have been used in the past, so that a major portion of tooling expenses to produce the barbell collar of the present invention can be eliminated. Additionally, construction details of such unit have been described in U.S. Pat. No. 2,752,174 issued June 26, 1956 to R. B. Frost, the teachings of such patent being hereby incorporated by reference, so that the pad support ring 12 in the locking assembly 14 need only be briefly described herein. It will, however, be noted that a pipe coupling such as that described in the reference patent provides only the preferred construction of the pad support ring 12 and locking assembly 14. It should not be inferred that the collar of the present invention is limited to incorporation of the pipe coupling shown. Rather, the use of the pipe coupling is preferred because such use minimizes costs of manufacture.

As shown in the drawings, the pad support ring 12 is comprised of two arcuate ring sections 16 and 18 that each extend through a semi-circular arc from a hinge connection 20 formed at one side of the pad support ring 12. At the opposite side of the ring 12, the sections 16 and 18 have free ends 22 and 24 respectively and are abutted when the ring 12 is closed so that the ring can enclose the bar of a barbell as has been shown in FIGS. 4 and 7.

As particularly shown in FIG. 2, each of the sections 16 and 18 of the pad support ring 12 has a U-shaped cross section so that grooves 26 and 28 are formed in inside peripheries 30 and 32 of the sections 16 and 18 respectively to extend the lengths of peripheries 30 and 32 from the hinge connection 20 to the free ends 22 and 24 of the sections 16 and 18.

The locking assembly 14 is mounted on portions of the pad support ring 12 opposite the hinge connection 20 and is comprised of a link mount 34 that is formed integrally with the section 16 of the pad support ring 12 to extend radially from such section 16 at the free end 22 thereof. A hole 36 is formed through the link mount 34 parallel to the axis of the pad support ring to receive a pin 38 by means of which a link, comprised of parallel arms 40 and 42 mounted on opposite sides of the link mount 34 is pivotally mounted on the link mount 34.

The locking assembly 14 further comprises a locking tab 44 formed integrally with the pad support ring section 18 to extend radially therefrom at the free end 24 of the section 18 so that the link mount 34 and locking tab 44 will abut when the pad support ring 12 is positioned in the closed condition shown in FIG. 3. The arms 40 and 42 have a length sufficient to extend about the locking tab 44 in the closed condition of the pad support ring 12 and a locking handle 46 is pivotally mounted between the arms 40 and 42 via a pin 48 in the side 50 of the locking tab 44 that faces away from the link mount 34 when the pad support ring 12 is closed. An arcuate depression 52 is formed in the side 50 of the locking tab 44 and the locking tab 46 has a nose portion 54 shaped and positioned such that the nose portion 54 can be extended into the depression 52 in the closed condition of the pad support ring 12. The locking handle 46 is further shaped so that portions thereof displaced across the pin 48 from the nose portion 54 can be extended in a curve along the outer circumference 56 of the pad support ring section 18 when the pad support ring 12 is closed as shown in FIG. 3. The nose portion 54 is formed on a curve and is further positioned so that the nose portion 54 can slide along the depression 52 to an overcenter position with respect to an arc between the pins 38 and 48 as the locking handle 46 is moved to a locking position shown in FIG. 3 to hold the pad support ring 12 in the closed position. Conversely, the locking handle 46 can be pivoted away from the pad support ring 12, as indicated by the directional arrow 58 in FIG. 3, to slide the nose portion 54 of the locking handle 46 along the depression 52 toward the outer periphery 56 of the pad support ring section 18 to lift the arms 40 and 42 from about the locking tab 44 so that the pad support ring 12 can be opened as shown in FIG. 1.

In Addition to the pad support ring 12 and locking assembly 14, the barbell collar 10 further comprises a plurality of elastomeric pads affixed to the inside of the pad support ring 12. In particular, the collar 10 preferably comprises a pad 60 disposed in the groove 26 of the section 16 and a pad 62 disposed in the groove 28 of the section 18. A suitable material for the construction of the pads 60 and 62 has been found to be neoprene having durometer hardness of substantially 50.

As shown in FIG. 2, the pads 60 and 62 extend substantially the width of the grooves 26, 28 and, moreover, substantially the lengths of the inside peripheries 30, 32 of the pad support ring sections 16 and 18. The thicknesses of the pads 60 and 62 are selected so that, when the pad support ring 12 is in the closed condition shown in FIG. 3 and the bar of a barbell extends through the pad support ring 12, the pads 60 and 62 will engage the bar and be compressed between the bar and the sections 16 and 18 of the pad support ring. It has been found that, for the extent of the pads 60 and 62 shown in the drawings and for the construction of the pads 60 and 62 from the material that has been identified, a compression of the pads 60, 62 approximately 10% of their radial thickness will insure gripping of the bar by the clamp 10 which will prevent even the heaviest loads that might be placed on the bar from forcing the clamp 10 from the bar. Thus, in one preferred construction, the pads 60, 62 are one half inch thick and are compressed approximately one sixteenth inch when the clamp 10 is placed on a bar having a diameter slightly under two inches.

The pads 60 and 62 are preferably secured within the sections 16 and 18 by means of an adhesive that bonds the outside peripheries 64 and 66 to portions of the rings 16 and 18 defining the bottoms of the grooves 26 and 28. An adhesive that has been found suitable for this purpose is Loctite TM Super Bonder TM 415 Instant Adhesive manufactured by Loctite Corporation of Newington, Conn. Additionally, the disposition of the pads 60, 62 in the grooves 26 and 28 provides additional security by preventing the pads 60, 62 from being dislodged from about the bar of a barbell and from within the pad support ring 12 even should the adherence of the pads 60, 62 to the sections 16, 18 be lost for some reason. Thus, so long as the pad support ring 12 is in the closed condition, no danger exists that weights on a barbell might in some manner, be released during a weight lifting exercise.

OPERATION OF THE PREFERRED EMBODIMENT

The mounting of the barbell collar 10 on the bar of a barbell, and the removal of the collar 10, will be clear from the above description of its construction. That is, the collar 10 is mounted on a bar by: (1) placing one of the sections 16, 18 against the bar so that the pad on such section extends about approximately half the bar; (2) closing the pad support ring 12 about the bar; (3) positioning the arms 40 and 42 of the link of the locking assembly 14 about the locking tab 44 with the nose portion 54 of the locking handle 46 at the base of the locking tab 44; and (4) pivoting the locking handle 46 to the position shown in FIG. 3 in which the locking handle 46 extends along a major portion of the outer periphery 56 of the pad support ring section 18. Similarly, to remove the collar 10 from a bar, it is necessary only to pivot the locking handle 46 in the direction 58 a distance sufficient to remove the nose portion 54 thereof from the depression 52, swing the locking assembly 14 to the position shown in FIG. 1, and open the pad support ring 12 so that the collar 10 can be moved laterally from the bar. It will be noted that the construction of the collar 10 described above facilitates control of the collar during mounting and removal of the collar. Because of the described structure, the collar 10 can be made to be light in weight and the elongated nature of its components facilitate grasping of the collar 10. While the mounting and removal of the collar 10 are thus clear, it is also useful to illustrate the manner in which weights can be added to a barbell or removed therefrom to provide a complete teaching of the operation of the barbell collar 10. FIGS. 4–7 have been provided for this purpose.

FIGS. 4–7 illustrate a method for adding a weight to a barbell, or removing a weight therefrom, without leaving weights on the barbell unconstrained while the weight being added or removed is moved on or off the end of the bar of the barbell. Thus, should the barbell be mounted on a support and become sufficiently unbalanced to become unstable, the barbell will fall but weights on the barbell will remain thereon so that the weight lifter and bystanders will not be in a position of having to avoid a number of moving heavy objects to avoid injury. All that need be done to avoid injury is to avoid the falling barbell and, perhaps, the rack.

Figure 5:
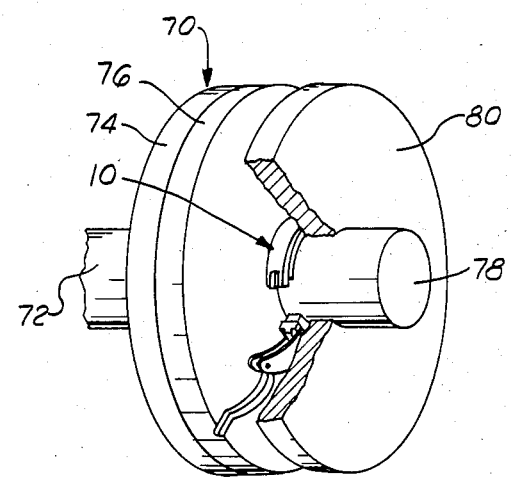
Figure 6:
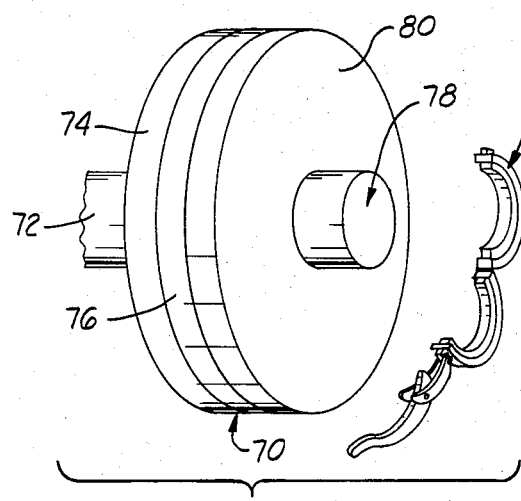
Figure 7:
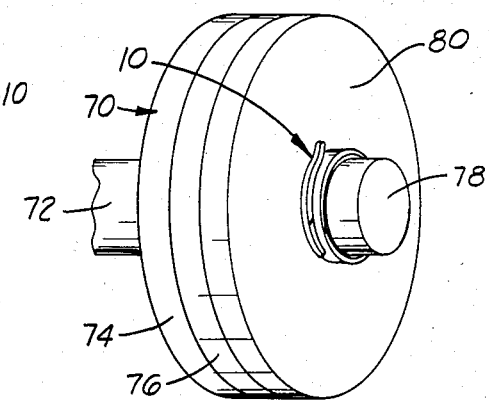

To illustrate this method, FIG. 4 shows a barbell 70 comprised of a bar 72 whereon are mounted weights 74 and 76 near one end 78 of the bar 72, the weights being held in place by a collar 10 disposed in the closed condition thereof between the weights 74 and 76 and the end 78 of the bar 72. To add a weight, such as the weight 80 shown in the drawings, the hole 82 through the weight 80 is placed over the end 78 of the bar 72, without first removing the collar 10, so that the weights 74 and 76 are held in place on the barbell 70 while the weight 80 is being placed on the barbell 70. Once the weight 80 has been placed on the bar 72, between the collar 10 and the end 78 of the bar 72 as shown in FIG. 4, the collar 10 is opened as shown in FIG. 5 so that the collar 10 can be drawn laterally away from the bar 72, as shown in FIG. 6, to permit the weight 80 to be moved along the bar 72 into abutment with the weight 76. Once the weight 80 has been positioned in abutment with the weight 76, the weight lifter then brings the collar 10 laterally into engagement with the bar 72, between the weight 80 and the end 78 of the bar 72, and closes the collar 10 about the bar 72 to secure the weights 74, 76 and 80 to the bar 72 as illustrated in FIG. 7. Thus, during the time that a change in weight on the end of the barbell occurs; that is, when the weight 80 is placed on the bar 72, to possibly unbalance the barbell 70 on its support, the weights 74 and 76 are securely fixed to the bar 72.

To remove the weight 80, a reverse procedure is followed. That is, the collar 10 is first opened and displaced from the bar to the position shown in FIG. 6 and the weight 80 is shifted along the bar 72 to permit the collar 10 to be placed between the weight 80 and the weight 76, as shown in FIG. 5, and closed about the bar as shown in FIG. 4 prior to removing the weight 80 from the bar 72. Once the collar 10 has been reclosed about the bar 72, the weight lifter can remove the weight 80 off the end 78 of the bar 72 so that the weights 74 and 76 are secured to the bar 72 when the removal of the weight 80 takes place.

It thus be seen that the only times that the barbell can be unbalanced, so that the barbell might fall and present a danger, are times at which weights on the bar 72 are securely mounted thereon. At other times, during which the collar is removed from the barbell 70, the weights on the barbell 70 will be sufficiently balanced that movement of the barbell, and possibly its support, will not occur. Thus, the construction of the barbell collar 10 to open and close about the bar 72 so that the collar 10 can be emplaced on the bar 72 without sliding the collar 10 over the end 78 permits the weight lifter to remove and replace the collar 10 only when no danger of toppling exists. At other times, when toppling is a possibility, weights on the barbell are securely held thereon by the closed collar 10 about the bar 72.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A collar for securing weights on the bar having opposite ends of a barbell, comprising:

a pad support ring comprising two arcuate sections hinged together at one side of the pad support ring so that the pad support ring can be opened and closed about said bar, each of the sections of the pad support ring terminating in a free end across the pad support ring from the hinged connection of the two sections of the pad support ring;

at least one pad disposed on the inside of each of the sections of the pad support ring to grippingly engage said bar when the pad support ring is closed about said bar, a groove being formed in the inside periphery of each section of the pad supporting ring with each groove being adapted to receive the pad disposed in that section, each pad having opposite ends;

securing means for securing the pads within the grooves of the sections of the pad support ring to prevent movement of the pads between the free end of each section and the hinged connection of the sections, the opposed ends of the pad in one section being spaced from the opposed ends of the pad in the other section when the pad support ring is closed about the bar; and linkage means having one portion movably connected to the free end of one of the sections of the pad support ring and another portion removably connectable to the free end of the other pad support ring for removably securing the pad support ring in the closed condition when said means is removably connected to the free end of said other section of the pad support ring, the pad support ring being positionable about the bar by moving the pad support ring over the bar at a position spaced a distance from one end of the bar with the bar being moved through the space between the free ends of the sections of the pad support ring in the opened position of the pad support ring to a position wherein the bar is disposed between the sections of the pad support ring, and said means being movable to a closed position wherein said means is removably connected to the free end portion of one of the sections of the pad support ring for removably locking the sections of the pad support ring in the closed position with the pads grippingly engaging the bar substantially to prevent axial movement of the pad support ring on the bar and substantially to secure the pad support ring to the bar.

2. The collar of claim 1 wherein the linkage means for holding the ring in a closed condition about said bar comprises:

a link mount projecting radially from one of the pad support ring sections at the free end of said one of the sections;

a locking tab projecting radially from the other of the pad support ring sections at the free end of said other of the sections, the tab having a depression formed in one side thereof facing away from the link mount in the closed condition of the pad support ring;

a link comprised of two parallel arms pivotally supported on opposite sides of the link mount and positionable thereon in the closed condition of the pad support ring to extend about the locking tab; and a locking handle pivotally supported between the arms of the link and having a nose portion extendable into the depression in the locking tab in the closed condition of the pad support ring.

3. The collar of claim 1 wherein each of the pads is defined further as being constructed of a compressible material.

4. The collar of claim 1 wherein each of the pads is defined further as being constructed of an elastomeric material.

5. The barbell collar of claim 1 wherein the pads are further characterized as being constructed of neoprene having a durometer hardness of substantially 50.

* * * * *